UNITED STATES PATENT OFFICE.

FRIEDRICH SEIDENSCHNUR, OF CHARLOTTENBURG, GERMANY.

PROCESS OF PRESERVING TIMBER BY MEANS OF PHENOLATE SOLUTIONS.

1,034,652. Specification of Letters Patent. Patented Aug. 6, 1912.

No Drawing. Application filed May 8, 1912. Serial No. 695,877.

*To all whom it may concern:*

Be it known that I, FRIEDRICH SEIDENSCHNUR, chemist, a subject of the King of Prussia and the German Emperor, residing at 12 Holtzendorff street, Charlottenburg, near Berlin, Kingdom of Prussia, German Empire, have invented a new and useful Improvement in Processes of Preserving Timber by Means of Phenolate Solutions; and I do hereby declare the following to be a full, clear, and exact description of the same.

My invention relates to processes of preserving timber by means of phenolate solutions.

In order to utilize the preserving property of many phenols, for example of the naphthols, in the impregnation of timber, solutions of the alkali or earth alkali phenolates were introduced into the timber and the free phenol was precipitated from the solutions by the action of carbonic acid or of gases containing carbonic acid. Aqueous solutions of the free phenols cannot be employed for impregnating timber on account of the phenols being only slightly soluble in water. The timber was impregnated with the phenolate solutions by firstly evacuating the timber and then introducing the phenolate solution under pressure. Hereupon, carbonic acid or gases containing the same were caused to act on the timber whose cells were filled with the phenolate solution. The precipitation of the phenol by the carbonic acid was only imperfect. The carbonic acid could act only on the outer cells of the timber. The phenol separated in the outside layers rendered difficult the further penetration of the carbonic acid. The sodium carbonate solution formed by the action of the carbonic acid in the outside layers exercised no action on the sodium phenolate solution in the lower layers, and did not absorb carbonic acid at all or only in very small quantities. For this reason the carbonic acid did not pass through the liquid into the lower layers. The inner cells of the timber thus contained undecomposed phenolate solution. Another proposed process consisting in firstly filling the pores of the wood with carbonic acid and then introducing phenolate solution into the timber had the defect that the quantity of phenol actually put into the wood was much too small for enabling the antiseptic action of phenol to be effective in all the cells of the timber, including the inner cells. The phenol was separated in the outer pores of the timber, as described above. The penetration of the carbonic acid into the lower layers of the timber was prevented for the same reasons as in the known process described above. The solution of sodium carbonate formed in the very narrow capillary tubes constituting the cells of the timber renders difficult or prevents the deep penetration of carbonic acid. Antiseptically acting phenol is therefore lacking in the inner cells.

A primary object of my invention is to provide a process of preserving timber by means of phenolate solutions to which these defects are not attached.

To this end, my improved process consists in not filling the pores completely with phenolate solution, but in introducing a quantity of phenolate insufficient for filling the pores and then distributing the phenolate solution in the pores so that substantially only the walls of the pores are impregnated with the phenolate solution, while the chambers in the pores remain free from liquid. The gas contained in the pores is then evacuated, whereupon carbonic acid or gases containing carbonic acid is or are introduced into the pores. For example, the timber may first be filled under pressure with a gas free from carbonic acid, *e. g.* air liberated from carbonic acid, whereupon phenolate solution is introduced while increasing the pressure in the impregnation tank. The gas which is present is allowed to escape out of the impregnation tank or cylinder according as the phenolate solution flows in when filling the cylinder. After the phenolate solution has acted sufficiently, the pressure is done away with and the gas evacuated in order to remove the phenolate solution from the interior of the cells of the timber. If desired, I may first introduce a large quantity of sodium phenolate solution into the timber without subjecting the same previously to evacuation, then run off the impregnation liquid out of the impregnation tank and, by evacuating once or more times, remove the excess of sodium phenolate solution out of the timber and simultaneously distribute the residue through the entire mass of the timber. Further, if desired, a small quantity of phenolate solution may be introduced into the pores and the phenolate solution can be distributed by the subsequent action of an indifferent gas free from carbonic acid or by steam. After the phenolate solution has been distributed in the interior of the timber carbonic acid or gases containing carbonic acid is or are inserted into the timber. After the removal of the gas in the pores the carbonic acid can enter into all the pores and precipitate the phenol. As the carbonic acid can remain in the timber for a somewhat long time the conversion of the phenolate is lasting.

I am aware that it has been proposed heretofore to coat the walls of the cells with a liquid by distributing the same without filling the cells, and to produce incrustations by a second liquid. A gas, as carbonic acid in the present case, has however not heretofore been employed for this purpose. Nor has it been proposed to precipitate phenols on the walls of the cells and to produce considerable antiseptic action with small quantities of phenols owing to the difficulty of dissolving the precipitated phenols.

My improved process may be carried into practice as follows:—The timber to be impregnated is put into an impregnation tank of known kind. The timber is first subjected in the tank to an air pressure of 1½ atmospheres for about half an hour. It is then impregnated with a sodium phenolate solution of about 4% at a temperature of 65° C. A liquid pressure of 8 atmospheres is now produced and maintained for one hour. The pressure is then done away with and a vacuum of 70 cms. is made twice and maintained for 20 minutes each time. The evacuated timber is then treated for half an hour with carbonic acid at a pressure of 4 atmos.

I claim:

1. A process of preserving timber by means of phenolate solutions which consists in impregnating the timber with a quantity of a phenolate solution insufficient for completely filling the cells of the timber, in uniformly distributing the phenolate solution in the timber and in subsequently introducing carbonic acid gas into the pores of the timber.

2. A process of preserving timber by means of phenolate solutions which consists in impregnating the timber with a quantity of a phenolate solution insufficient for completely filling the cells of the timber, in uniformly distributing the phenolate solution in the timber and in subsequently introducing a mixture of gases containing carbonic acid gas into the pores of the timber.

In testimony whereof, I have signed my name to this specification in the presence of two subscribing witnesses.

FRIEDRICH SEIDENSCHNUR.

Witnesses:
  HENRY HASPER,
  WOLDEMAR HAUPT.